United States Patent [19]

Bially

[11] Patent Number: 4,656,319

[45] Date of Patent: Apr. 7, 1987

[54] ALARM SYSTEM TESTER

[75] Inventor: Theodore Bially, Sudbury, Mass.

[73] Assignee: Lifeline Systems, Inc., Watertown, Mass.

[21] Appl. No.: 736,557

[22] Filed: May 21, 1985

[51] Int. Cl.⁴ .................... H04M 11/04; H04M 1/24
[52] U.S. Cl. ...................................... 379/29; 379/49; 379/51
[58] Field of Search ........ 179/2 A, 5 R, 5 P, 175.2 A, 179/175.2 C, 175.1 R, 175.11; 340/516

[56] References Cited

U.S. PATENT DOCUMENTS

| | | | |
|---|---|---|---|
| 3,407,274 | 10/1968 | Hribik et al. | 179/175.1 A |
| 3,549,810 | 12/1970 | Driscoll et al. | 179/5 R |
| 4,040,013 | 8/1977 | Carlson | 179/5 R X |
| 4,259,548 | 3/1981 | Fahey et al. | 179/5 R |
| 4,273,961 | 6/1981 | Blank et al. | 179/5 R |
| 4,284,849 | 8/1981 | Anderson et al. | 179/5 R |
| 4,308,430 | 12/1981 | Fahey et al. | 179/5 R |
| 4,361,730 | 11/1982 | Barber et al. | 179/5 R |
| 4,398,147 | 8/1983 | Shankland | 179/175.2 C X |
| 4,482,785 | 11/1984 | Finnegan et al. | 179/5 P |
| 4,486,625 | 12/1984 | Reinauer et al. | 179/2 A |

FOREIGN PATENT DOCUMENTS

| | | | |
|---|---|---|---|
| 96886 | 12/1983 | European Pat. Off. | 179/5 R |
| 2106354 | 4/1983 | United Kingdom | 179/5 R |

Primary Examiner—Keith E. George
Attorney, Agent, or Firm—Weingarten, Schurgin, Gagnebin & Hayes

[57] ABSTRACT

A novel alarm system tester is disclosed for use in verifying the operation of subscriber stations in an alarm system of a type having a central monitoring station and a plurality of subscriber stations operative to automatically dial the telephone number of the central monitoring station and to report the occurrence of an alarm event to the central monitoring station. The tester in accordance with the present invention permits the verification of the automatic dialing function of the subscriber station and additionally, provides for verification that the subscriber station can transmit messages to the central monitoring station in accordance with a defined communication protocol. The entire test sequence is completed in a single telephone communication.

12 Claims, 4 Drawing Figures

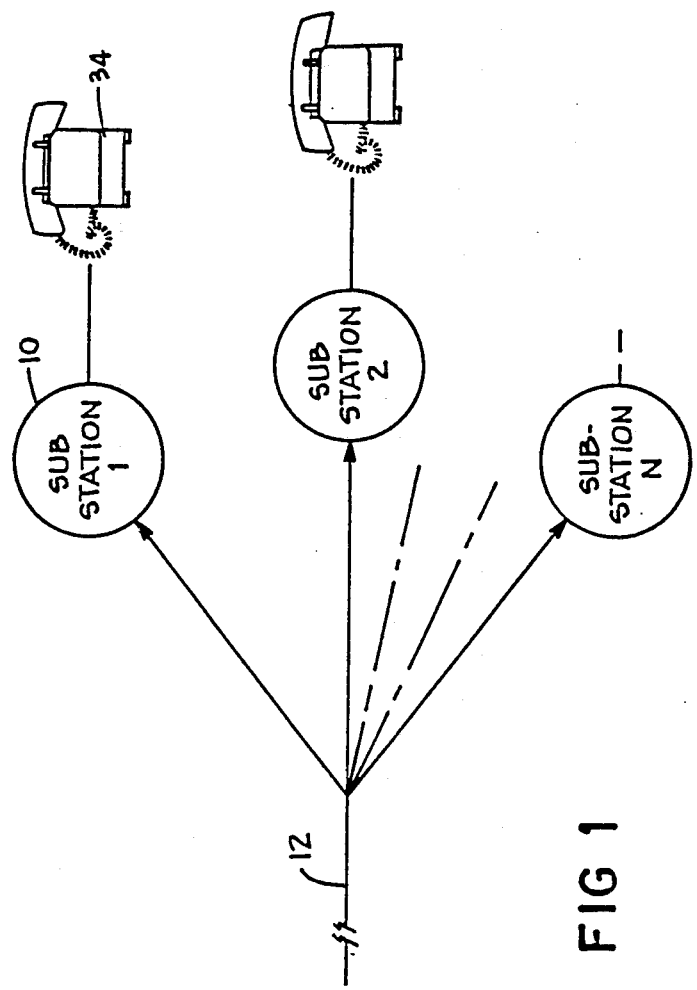

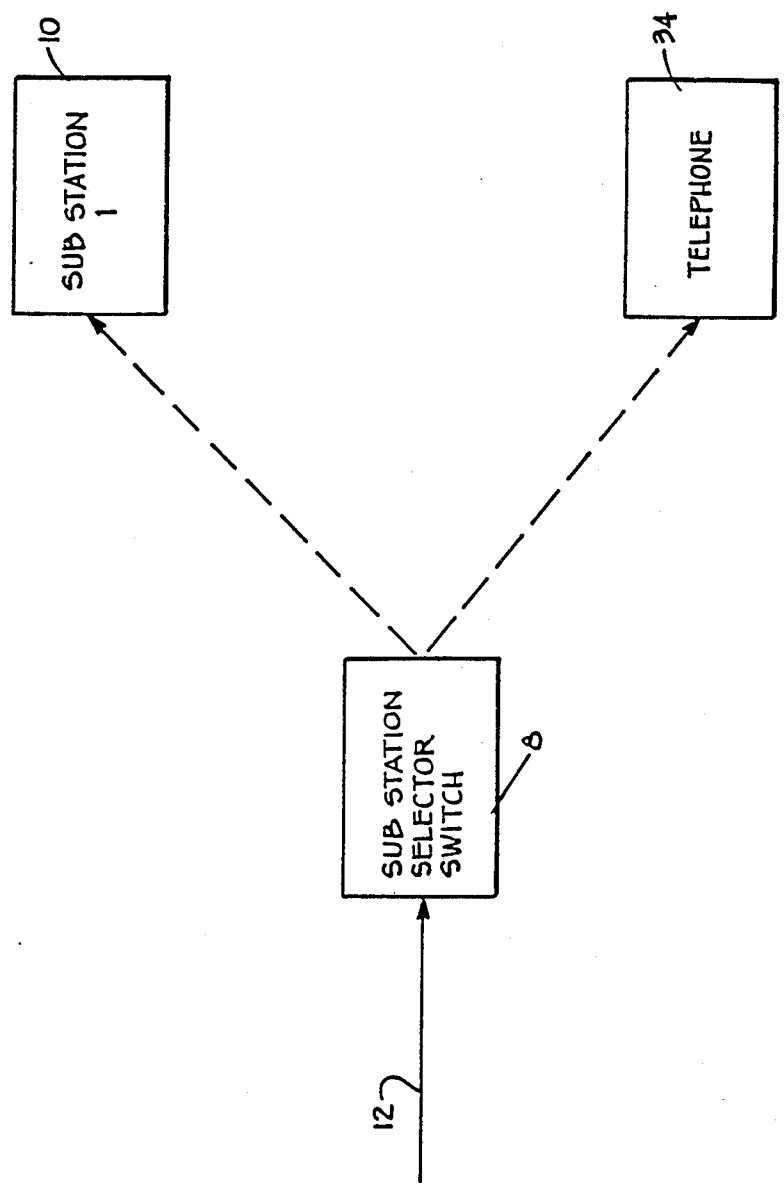

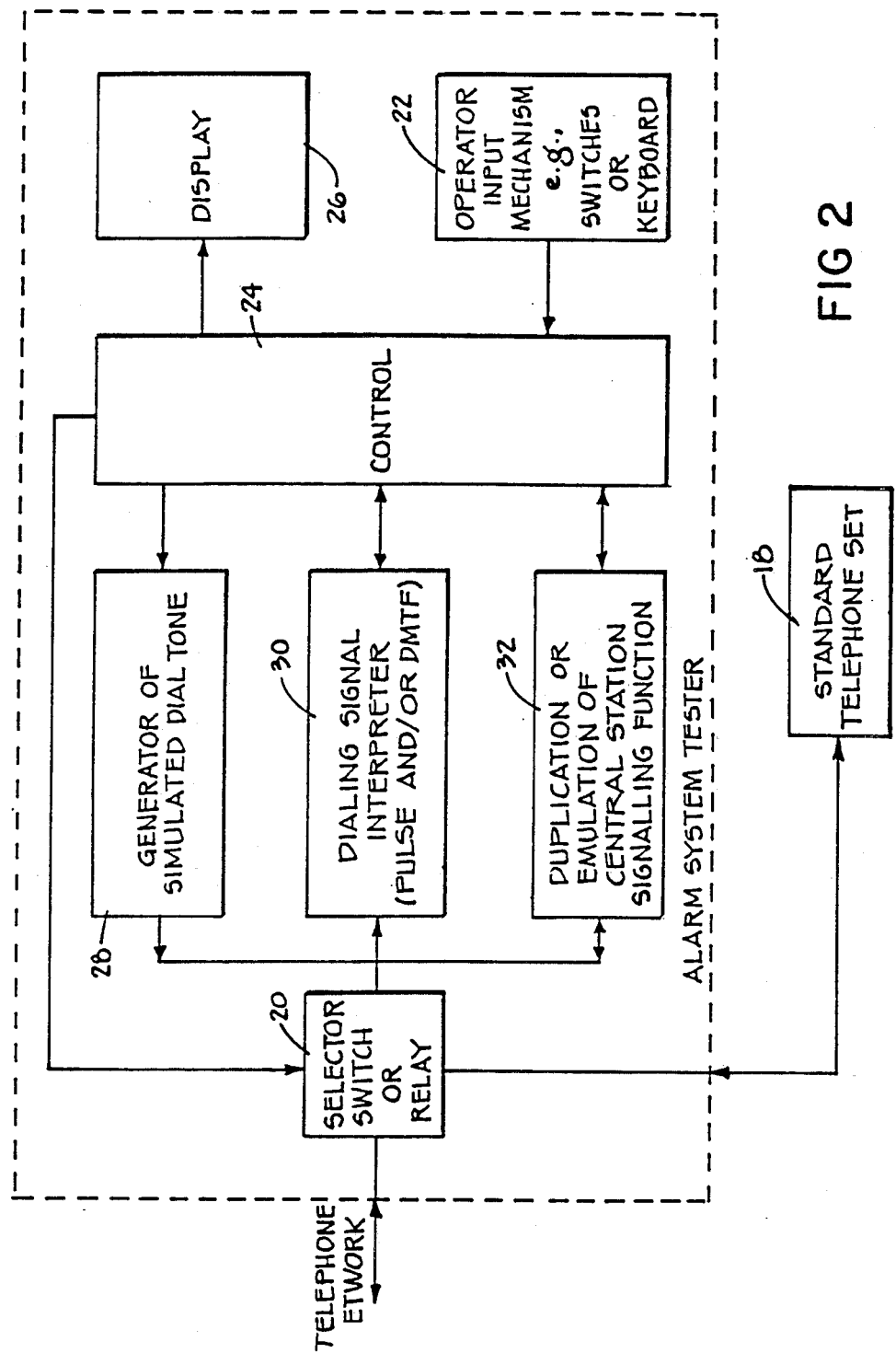

ALARM SYSTEM TESTER

FIELD OF THE INVENTION

This invention relates to alarm systems, and more particularly, to an alarm system tester employed in the verification of alarm system operation.

BACKGROUND OF THE INVENTION

Centralized alarm systems which include a central monitoring station and a plurality of remote subscriber stations are well known. In such systems, the subscriber stations are provided with one or more selected sensors and, either at predetermined times, or upon sensing specified conditions, transmit messages over a communications link to the central monitoring station. The central monitoring station analyzes messages received from the respective subscriber stations and typically provides an output for use by an operator at the central monitoring station. In the present context, a central monitoring station includes any facility such as a hospital, a fire station, a phone answering facility, or a burgular alarm central station monitoring service, in which a centralized monitoring function is performed in response to inputs provided by a number of remote devices operative to sense selected conditions.

In alarm systems such as personal alarm systems, fire alarm systems, burgular alarm systems and the like, reliability of the system is of paramount importance. Subscribers must be assured that, in the event of an alarm condition, the subscriber station will function as intended, for the failure of a system to operate in its intended manner, in certain circumstances, could result in loss of life, personal injury, or significant property damage. It will further be appreciated that the testing of the subscriber stations, which by necessity are diversely located, poses a significant problem. The cost of having service personnel periodically verify the operation of each subscriber station by visiting the sight of the subscriber station to perform hands-on tests is economically prohibitive. Other conventional test methods can sometimes involve up to five telephone communications between the central monitoring station and each subscriber. In one commercial personal alarm system offered by the assignee of the present invention the verification of subscriber system operative involves the following procedure. An operator at the central monitoring station telephones the subscriber and indicates that it is desired to test the subscriber's station. The operator and the subscriber terminate this telephone call and thereafter the subscriber activates an alarm condition at the subscriber station. In response to such activation, the subscriber station automatically dials the central monitoring station and transmits a predetermined message. After receipt of this message at the central monitoring station and termination of this call, the central monitoring station operator once again calls the subscriber to advise of the test result and to request that the subscriber initiate a reset call. After termination of this telephone communication, upon activation by the subscriber, the subscriber station once again initiates an automatic dialing sequence and transmits a second message to the central monitoring station. Following this transmission, the central monitoring station operator may again call the subscriber, advise that the second message has been received, and that the system is operational.

While not all test protocols will necessarily follow this procedure, it is clear that monthly testing of subscriber stations may involve substantial numbers of telephone communications between the central monitoring station and each subscriber station. These calls, particularly in a large alarm system, require a significant investment in time and further burden the processing capabilities at the central monitoring station in view of the need for the central station to process both the alarm message and the second message transmitted by each subscriber station.

SUMMARY OF THE INVENTION

In accordance with the present invention, there is disclosed an alarm system tester which permits verification of subscriber station operation via a single telephone communication between the alarm system tester and the subscriber station under test. The alarm system tester may be located remote from the central monitoring station, adjacent the central monitoring station, or may be integral with the central monitoring station. The presently disclosed system avoids the time consuming and expensive procedures previously encountered in testing subscriber stations in centralized alarm systems and reduces processing burdens on the central monitoring station.

The alarm system tester in accordance with the present invention, permits verification that a subscriber station is operative to properly sense a given alarm condition, and that the tester will automatically dial the correct central station telephone number in response to the alarm condition. The tester further verifies that the subscriber station will transmit required messages correctly and in accordance with established communication protocols. The disclosed alarm system tester provides for verification of the above described functions from a remote location that need not be that of the central monitoring station without intervention or participation of the central monitoring station or its personnel.

The tester is coupled to a telephone network via a selector switch. A telephone set is interfaced to and routed through the tester and selectively coupled to the telephone network via the selector switch. The tester further includes apparatus for generating a simulated dial tone, apparatus for interpreting pulse and/or DTMF (tone) signals produced by a subscriber station, and apparatus for duplication or emulation of central station signalling functions. The dial tone generator, dial signal interpreter, and central station emulation apparatus are selectively coupled to the telephone network via the selector switch. An operator input mechanism such as switches or a keyboard, is provided to permit data input and a display is included to provide output for an alarm system tester operator. The tester further includes control circuitry operative to control the activation and data flow associated with the dial tone generator, pulse interpreter, emulation apparatus, operator input mechanism and the display.

Operation of the alarm system tester in accordance with the present invention is summarized below. To initiate testing of a subscriber station, an operator at the location of the alarm system tester calls the telephone number of the subscriber station to be tested. When an individual at the subscriber station answers the subscriber's telephone, the operator then advises such individual that a test of the subscriber station is to be conducted. The operator also advises such individual to expect approximately thirty to forty seconds of silence on the telephone during the test. The operator then requests that the individual at the subscriber station cause an alarm condition. This may be accomplished in the case of a personal alarm system by activating a personal alarm "help" button which is typically employed by the infirm or incapacitated to summon assistance. A substitute or like switch may also be employed. In the case of a fire alarm, or a burgular alarm system, the respective alarm sensors may be triggered or simulations thereof may be provided to initiate an alarm sequence at the subscriber station.

In response to the alarm condition, the apparatus at the subscriber station seizes the telephone line and goes on hook (hangs up) for several seconds. The telephone network, during such interval, maintains the connection between the alarm system tester and the apparatus at the subscriber station since the telephone network does not immediately disconnect a call when the called party hangs up his phone. After this interval of several seconds, the apparatus at the subscriber station goes off hook.

If the subscriber station is of a type which awaits a dial tone prior to initiating automatic dialing, the alarm system tester produces a simulated dial tone to "fool" the subscriber station into reacting as if it has seen a dial tone produced by the telephone network. In response to the simulated dial tone, the subscriber station automatically dials an assigned telephone number which corresponds to that of the central monitoring station.

In subscriber stations which do not require a dial tone to induce automatic dialing, the subscriber station, in response to the alarm condition, seizes the telephone line, goes on hook (hangs up) for several seconds, and thereafter reestablishes an off hook condition and initiates automatic dialing of the central monitoring station.

The dial signal interpreter in the alarm system tester counts the dial pulses produced by the subscriber station apparatus or alternatively decodes DTMF tones produced by the subscriber station depending on whether the subscriber station operates in the pulse dialing or tone dialing mode, respectively. Following receipt of the dialed telephone number from the subscriber station apparatus, the alarm system tester compares the received telephone number with that expected to be dialed and/or produces a visual display so the alarm system tester operator may verify the correctness of the received number. Thereafter, the alarm system tester transmits a control signal to the subscriber station. This control signal emulates a signal produced in normal operation by the central monitoring station and indicates to the subscriber station that the central monitoring station is on line.

In response to receipt of this control tone, the subscriber station transmits a message to the alarm system tester over the telephone network as if such tester were the central monitoring station. Typically, data transmitted by the subscriber station will include subscriber identifying information. Additionally, the data may include status information identifying the cause of the alarm. Following receipt of such data, and verification of the correctness of such data, the alarm system tester transmits an end of message acknowledgement tone over the telephone network to the subscriber station. In response to this end of message tone, the subscriber station disconnects from the telephone link and reestablishes the telephone at the subscriber station in an off hook condition. Simultaneously, the alarm system tester connects the local telephone to the telephone network and disconnects the test apparatus thereby reestablishing voice communication between the alarm test system operator and the individual at the subscriber station.

Following this sequence, the alarm test system operator may request that the individual at the subscriber station activate a reset switch or any other appropriate function which causes a subsequent automatic dialing sequence and message transmission. The above described sequence is repeated until the operator at the alarm system tester has verified operation of the subscriber station or until such time that it is determined that a service call is required.

After completion of all tests, the alarm system tester operator informs the individual at the subscriber station of the test results and the telephone call is terminated. It is noted that the entire validation procedure is accomplished via a single telephone call from an operator at the alarm system tester to the subscriber station.

DESCRIPTION OF THE DRAWINGS

The invention will be more fully understood by reference to the following detailed description in conjunction with the accompanying drawings in which:

FIG. 1 is an overall pictorial representation of a system incorporating an alarm system tester in accordance with the present invention;

FIG. 1A is a block diagram representation of the coupling of a sub station and telephone to the telephone communication link;

FIG. 2 is a block diagram of the alarm system tester depicted in FIG. 1; and

DETAILED DESCRIPTION OF THE INVENTION

Figure 3:
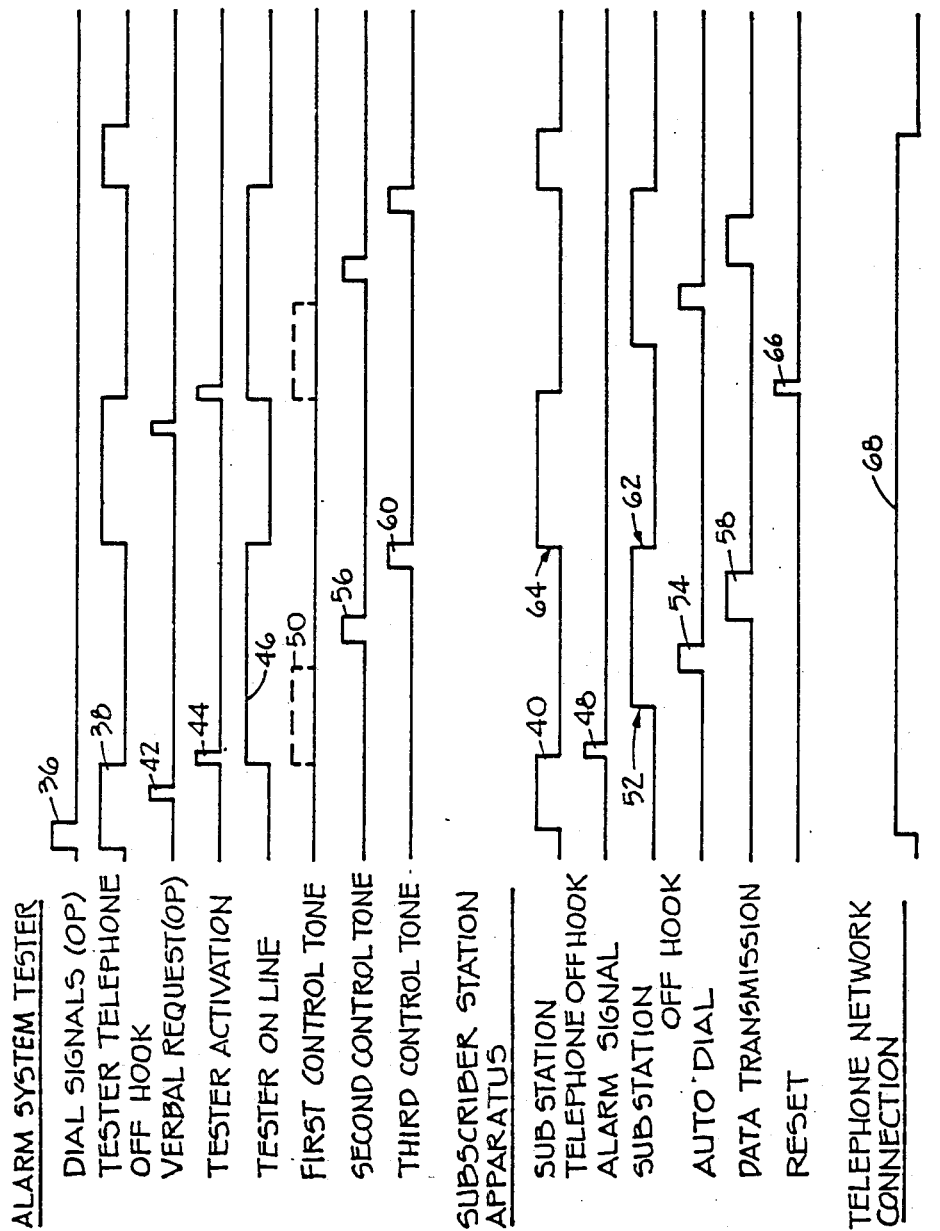
FIG. 3 is a timing diagram illustrating signal timing in a system operative in accordance with the teachings of the present invention.

A system incorporating a test station which serves to verify the operational capabilities of alarm apparatus disposed at a plurality of alarm sites is depicted in FIG. 1. In a typical alarm system, a plurality of subscriber stations 10 interface over a communication link, such as a telephone network communication link 12 to a central monitoring station 14. In normal operation, upon detection of an alarm condition, alarm station apparatus 10 automatically seizes the telephone line 12 and dials the telephone number of the central monitoring station 14. Thereafter, the subscriber station apparatus 10 transmits a message over the communication link 12 to the central monitoring station 14 which includes subscriber identifying information and may include data indicative of the alarm condition. The alarm system tester 16, in accordance with the present invention, also interfaces to the telephone communication link 12. A telephone set 18 is selectively interconnected to the communication link 12 via s switch included in the alarm system tester 16. An operator located at the site of the alarm system tester 16 may employ the tester to verify operation of the remote subscriber stations 10 via a single telephone call placed to the telephone number of the respective subscriber station 10 by the operator.

The sub station selector switch 8 is shown in block diagram form in FIG. 1A. This switch 8 is physically located at each respective sub station 10, and is operative to couple the telephone communication link 12 between either the associated sub station 10 or the telephone 34. The switch 8 is similar in operation to the switch 20 of the tester (FIG. 2).

The alarm system tester 16 is shown in block diagram form within the dotted box in FIG. 2 and system timing is illustrated in FIG. 3. The alarm system tester 16 includes a selector switch or relay 20 for coupling the test system 16 alternatively between a telephone set 18 and the remaining circuitry of the alarm system tester 16. An operator input mechanism 22 which typically includes one or more switches and/or a keyboard interfaces to control circuitry 24. The control circuitry 24 also interfaces to a display 26 which may include a monitor, an alphanumeric display, or any other suitable display device. The alarm system tester 16 further includes a generator 28 which produces and applies simulated dial tone signals to the selector switch 20 in response to a control signal produced by control circuitry 24. The control circuitry 24 also provides signals to a dial signal interpreter 30 and receives signals therefrom. The dial signal interpreter 30 receives signals from the telephone network or link 12 at such times when the alarm system tester is connected to the telephone network 12 via the switch or relay 20. The control circuitry 24 also provides signals to and receives signals from the central station signal emulator 32, which is operative to duplicate or emulate the signalling functions of the central monitoring station 14. The control circuitry 24 senses the state of selected switches of the operator input mechanism 22 or alternatively keyboard commands from the operator input mechanism 22 and, based thereon, generates an output signal which causes the selector switch 20 to connect either the telephone set 18 or the alarm system tester 16 to the telephone network 12. In the quiescent or inactive state, the alarm system tester 16 circuitry is not connected to the telephone network 12 and the telephone set 18 is connected to the telephone network 12 via the switch or relay 20 for normal telephone operation.

In operation, an operator at the site of the alarm system tester 16 employs the telephone set 18 to dial the telephone number of a subscriber station 10 and the operator thereby establishes telephone voice communications with an individual employing a telephone set 34 at the subscriber station 10, as illustrated by the dial signal 36 and the tester telephone off hook signal 38. After dialing by the operator, as illustrated by signal 36, the individual at the subscriber station 10 lifts the receiver of the telephone set 34 causing the subscriber station telephone to go off hook as illustrated by signal 40. The subscriber station telephone 34 must be on the same telephone line that is employed for the subscriber station 10. The alarm system tester 16 operator, after establishing voice communication with the individual at the subscriber station 10 location requests that such individual cause an alarm condition at the subscriber station as shown schematically by signal 42. The operator then activates the tester 16 via input mechanism 22 as illustrated by signal 44. In response to the activation signal 44, the switch or relay 20 disconnects the telephone set 18 from the telephone network 12 and connects the alarm system tester 16 circuitry to the network under the control of circuitry 24 as shown by the tester telephone off hook signal 38 and the tester on line signal 46.

In response to the request by the alarm system tester operator, the individual at the subscriber station causes an alarm condition as illustrated by the alarm signal 48. This alarm signal may be generated in a personal alarm system by depressing a "help button" which indicates that a subscriber needs medical assistance. Alternatively an alarm signal may be activated by triggering a sensor in a burgular alarm system, a fire alarm system, or by simulating an alarm condition by any suitable means.

In response to the alarm signal 48, the subscriber station 10 disconnects the subscriber telephone set 34 from the network 12 as shown by signal 40. For a defined interval thereafter, both the subscriber telephone set 34 and the subscriber station 10 are on hook as illustrated by the telephone off hook signal 52. After this interval, the subscriber station seizes the telephone line (goes on hook) as illustrated by signal 52. This on hook interval is provided in the event a subscriber has inadvertently or otherwise removed the telephone handset from the receiver which would preclude proper dialing. By assuring that both the telephone and the subscriber station are on hook for the defined interval, prior to the subscriber station 10 going off hook, the likelihood that the telephone network 12 will provide a dial tone so as to permit proper dialing is increased.

If the subscriber stations 10 are of a type which, upon activation of an alarm condition, automatically dial a prescribed number only after detection of a dial tone, the tester 16 generates such a tone and applies a simulated dial tone signal 50 (first control signal) to the telephone network 12 following the transition of the tester on line signal 46 to the active state as illustrated in FIG. 3. The presence of the simulated dial tone 50 on the telephone network 12, "fools" the subscriber station 10 into reacting as though the subscriber station 10 had received a dial tone produced by the telephone network 12. Thus, the subscriber station 10 automatically dials the telephone number of its assigned central monitoring station 14 as illustrated by the auto dial signal 54. The simulated dial tone signal 50 terminates upon detection of dial signals 54 by the alarm system tester 16.

If the subscriber stations 10 are of a type which automatically dial a prescribed number unconditionally upon the occurence of an alarm signal 48, dialing occurs at a predetermined time following the occurence of the alarm condition as shown by the auto dial signal 54.

Following tester activation, the control circuitry 24 in the alarm system tester 16 activates dial signal interpreter circuitry 30 which is operative to receive and decode the telephone number dialed by the subscriber station 10. The dial signal interpreter circuitry 30 produces an output signal representative of the dialed telephone number caused by conventional pulse dialing or alternatively as the result of DTMF signals (tone dialing). When the subscriber station 10 has completed the dialing of the central monitoring station number, the alarm system tester 16 may compare the received telephone number dialed by the subscriber station 10 with the number the subscriber station 10 is expected to dial. In one embodiment of the invention, this comparison may be made by the dial signal interpreter 30 or the control circuitry 24. In another embodiment of the invention, the telephone number dialed by the subscriber station 10 and received by the dial signal interpreter 30 is read by the control circuitry 24 and output to the display 26, thereby permitting a comparison of the received telephone number against the expected telephone number to be made by the alarm system tester 16 operator. Verification in one or both of the above manners thereby assures that the subscriber station 10 under test properly functions in dialing the assigned central monitoring station 14 telephone number.

Following receipt and decoding of the auto dial signals 54 by the alarm system tester 16, the tester emulation circuitry 32 produces a second control signal 56 and applies this signal to the telephone network 12. This signal emulates a signal that would be produced by a central monitoring station 14 during a normal data exchange with a subscriber station 10. The subscriber station 10 decodes the second control signal 56 and in response thereto transmits a message 58 containing subscriber identifying information. Additionally, the message 58 may include data identifying the nature of the alarm condition or other appropriate data desired in a specific alarm system. The data contained in the message 58 is received by the alarm test system 16 emulation circuitry 32 and is verified either by the emulation circuitry 32 or control circuitry 24. The received data can, alternatively or additionally, be output to the display 26 for inspection by the alarm system tester 16 operator. The ability of an operator to ascertain the actual data via the display 26 or otherwise via a suitable output mechanism is of significant value in the diagnosis and correction of faults in the event that the subscriber station has dialed an incorrect number or transmitted an incorrect message.

After receipt and verification of the message 58, the alarm system tester 16 emulation circuitry 32 produces a third control signal 60 and transmits this signal 60 over the telephone network to the subscriber station 10. In response to the third central signal 60, the subscriber station 10 deactivates the subscriber station (goes on hook) as illustrated by signal 52 transition 62 and activates the subscriber station telephone set 34 at the subscriber station 10 as illustrated by signal transition 64. Concurrent with the third control signal 60, the control circuitry 24 activates the switch or relay 20 to cause the alarm system tester 16 to go on hook and the alarm system tester 16 to go off hook thereby reestablishing voice communication between the alarm test system 16 operator and the individual at the subscriber station 10.

The operator may then explain the results of the prior test and request that the individual initiate another test sequence by activating a reset button to produce a reset signal 66 or by causing any other test sequence to be initiated. The test sequence proceeds in the above described manner and terminates with the operator once again in telephone voice communication with the individual at the subscriber station Upon the completion of all desired test sequences, the test operator and the individual at the subscriber station hang up their respective telephone sets or otherwise disconnect phone service to terminate the call.

The alarm system 16 tester operative in accordance with the present teaching, thereby permits verification of dialing and data transmission characteristics of a remote subscriber station 10 via a single telephone call or connection as shown by connection signal 68.

The above described alarm system tester is illustrative of a novel system and method of verifying the operation of remote alarm reporting apparatus. Other modifications, embodiments, and departures from the present disclosure are possible without departing from the inventive concepts contained herein. Consequently, the invention is to be viewed as embracing each and every novel feature and novel combination of features present in or possessed by the apparatus and method herein disclosed and/or to be limited solely by the scope and spirit of the appended claims.

What is claimed is:

1. Apparatus for verifying the operation of an alarm system of the type including a telephone network, a central monitoring station interfaced to said telephone network, and a plurality of subscriber stations interfaced to said telephone network and operative to automatically dial the central station and transmit information indicative of the occurence of an alarm condition over said network to said central monitoring station, said apparatus comprising:

first selector switch means having at least a first switch state and a second switch state;
a first telephone set;
test system circuitry;
said first selector switch means operative to couple said first telephone set to said telephone network when in said first state and to decouple said first telephone set from said network when in said second state;
said first selector switch means further operative to couple said test system circuitry to said telephone network when in said second state and to decouple said test system circuitry from said telephone network when in said first state; and
said first telephone set being operative when said first selector switch means is in said first state to permit an operator to dial a telephone number corresponding to a selected subscriber station;
circuitry connected to each subscriber station including:
second selector switch means having at least a first state and second state;
a second telephone set;
said second selector switch means operative to couple said second telephone set to said telephone network when in said first state and to decouple said second telephone at from said network when in said second state;
said second selector switch means further operative to couple said subscriber station to said network when in said second state and to decouple said subscriber station from said network when in said first state;
said first and second selector switches assuming said first state prior to a test sequence to permit an operator at the test system apparatus to initiate a call to a selected subscriber station by employing said first telephone set and dialing a number corresponding to the telephone number of the selected subscriber station so as to establish telephonic voice communication between said operator and an individual at said selected subscribed station employing said second telephone set;
means associated with said subscriber station circuitry and operative in during a test for
causing said second selector switch to assume said second state;
during a test the selected subscriber station is activated to automatically generate dial signals corresponding to the telephone number of said central monitoring station and apply said dial signals to said network;
means associated with said test system circuitry for receiving said dial signals when said first selector switch is in said second state and for producing output signals corresponding to said received dial signals.

2. The apparatus of claim 1 further including display means associated with said test system circuitry for producing a visual display representative of said output signals.

3. The apparatus of claim 1 further including:
input means for allowing an operator to input to said test system circuitry signals corresponding to a predetermined telephone number; and
means associated with said test system circuitry for comparing said output signals to said signals representative of said predetermined number.

4. The apparatus of claim 1 further including:
means associated with said test system circuitry for producing a first signal after receipt of said dial signals and for applying said first signal to said telephone network;
wherein said subscriber station decodes said first signal and in response thereto transmits selected data over said telephone network for receipt by said test system circuitry;
means associated with said test system circuitry for receiving said transmitted data.

5. The apparatus of claim 4 wherein said first signal is a signal of a first defined frequency.

6. The apparatus of claim 4 further including means associated with said test system circuitry for receiving said transmitted data and display means for providing a visual display of said transmitted data.

7. The apparatus of claim 4 further including:
means associated with said test system circuitry for receiving said transmitted data;
input means associated with said test system circuitry for allowing said operator to input selected data to said test system circuitry;
means for comparing said received data with said input data and for producing a signal indicative of the result of said comparison.

8. A method for testing subscriber stations in an alarm system of a type including a central monitoring station which interfaces to a telephone network and a plurality of subscriber stations which interface to said network, said subscriber stations being operative to automatically dial the telephone number of the central monitoring station following the occurence of an alarm condition and upon the detection of a dial tone signal on said telephone network; said method consisting of the steps of:
initiating a call from an alarm system tester at a first location to a selected subscriber station at a second location remote from said first location to establish telephone voice communication between an operator at the alarm system tester and an individual at the subscriber station;
activating an alarm at said selected subscriber station which causes a telephone on hook condition and normally causes automatic dialing of a predetermined telephone number by said selected subscriber station after detection by said subscriber station of a dial tone on said telephone network;
producing a simulated dial tone at said alarm system tester and applying said simulated dial tone to the telephone network for receipt by the subscriber station;
receiving said simulated dial tone at said subscriber station and in response thereto applying said signals to said telephone network corresponding to a predetermined telephone number;
receiving said signals corresponding to said predetermined telephone number at said alarm system tester and producing output signals corresponding to said received signals; and
comparing said output signals representative of a received telephone number against signals corresponding to an expected telephone number.

9. Method for testing an alarm system comprising the steps of:
establishing a telephone communication between an alarm system tester and a selected subscriber station;
activating an alarm system tester for receipt of signals on said telephone network;
activating an alarm at a selected subscriber station;
producing a first control signal at said alarm system tester and applying said first control signal to said telephone network;
receiving said first control signal at said subscriber station and in response thereto producing signals representative of a predetermined telephone number and applying such signals to said telephone network;
receiving said telephone signals from said subscriber station representative of said predetermined telephone number at said alarm system tester and producing output signals representative of said received signals.

10. The method of claim 9 further including the steps of:
producing a second control signal at said alarm system tester following receipt of said signals representative of said predetermined telephone number and applying said second control signal to said telephone network.

11. The method of claim 10 further including the steps of
receiving said second control signal at said subscriber station and producing a control response signal in response thereto;
generating electrical signals representative of subscriber identifying information in response to said control response signal; and
applying said electrical signals representative of said subscriber identifying information to said telephone network for receipt by said alarm system tester.

12. The method of claim 11 further including the steps of:
receiving said electrical signals representative of said subscriber identifying information at said alarm system tester and producing output signals representative of said received signals;
producing a third control signal at said alarm system tester after receipt of said electrical signals representative of said subscriber identifying information and applying said third control signal to said telephone network.

* * * * *